US006036027A

United States Patent [19]

Grimes

[11] Patent Number: 6,036,027

[45] Date of Patent: Mar. 14, 2000

[54] VIBRATORY CLEANER

[75] Inventor: David B. Grimes, Greenfield, Mass.

[73] Assignee: Beloit Technologies, Inc., Wilmington, Del.

[21] Appl. No.: 09/016,119

[22] Filed: Jan. 30, 1998

[51] Int. Cl.[7] .............................. B03B 5/28; B01D 21/26; B01D 17/06

[52] U.S. Cl. .......................... 209/725; 209/724; 210/748; 210/512.1; 210/787

[58] Field of Search ............................ 209/590, 724–725, 209/727, 726, 732, 733, 208, 210; 210/748, 243, 295, 304, 787

[56] References Cited

U.S. PATENT DOCUMENTS

| | | | |
|---|---|---|---|
| 2,102,525 | 12/1937 | Freeman . | |
| 2,787,374 | 4/1957 | Krebs . | |
| 2,809,567 | 10/1957 | Woodruff . | |
| 3,405,803 | 10/1968 | Bähr et al. . | |
| 3,558,484 | 1/1971 | Carr | 209/732 |
| 3,893,914 | 7/1975 | Bobo | 210/512 |
| 3,957,650 | 5/1976 | Petrushkin et al. | 210/380 |
| 4,259,180 | 3/1981 | Surakka et al. . | |
| 4,309,283 | 1/1982 | Vikiö et al. . | |
| 4,378,289 | 3/1983 | Hunter . | |
| 4,414,112 | 11/1983 | Simpson et al. | 209/725 |
| 4,578,199 | 3/1986 | Peel et al. . | |
| 4,786,412 | 11/1988 | Lister et al. . | |
| 4,797,203 | 1/1989 | Macierwicz | 209/733 |
| 4,842,145 | 6/1989 | Boadway . | |
| 4,877,516 | 10/1989 | Schram | 209/210 |
| 4,919,796 | 4/1990 | Vikiö . | |
| 5,024,755 | 6/1991 | Livsey . | |
| 5,240,115 | 8/1993 | Crossley et al. . | |
| 5,266,198 | 11/1993 | Vikiö . | |
| 5,566,835 | 10/1996 | Grimes | 209/731 |
| 5,651,466 | 7/1997 | Satomi | 209/734 |
| 5,882,530 | 3/1999 | Chase | 209/725 |
| 5,900,147 | 5/1999 | Ekberg | 210/243 |

FOREIGN PATENT DOCUMENTS

| | | |
|---|---|---|
| 105037 | 4/1984 | European Pat. Off. . |
| 3329256 | 2/1984 | Germany . |

OTHER PUBLICATIONS

"Uniflow Cleaners, " by Beloit Corporation, Beloit, Wisconsin.

"Beloit Jones Posiflow™" by Beloit Corporation, Beloit Wisconsin.

"Acoustic Separation Technology" Jun. 22, 1999.

*Primary Examiner*—Donald P. Walsh
*Assistant Examiner*—Brett C. Martin

[57] ABSTRACT

Fiber-containing stock is fed into a hydrocyclone with a wall structure which generates quasi-laminar flow within the hydrocyclone housing. A piezoelectric oscillator introduces ultrasonic waves into the quasi-laminar flow to achieve high volume separation of heavyweight particles from the acceptable fibers with improved differentiation.

14 Claims, 2 Drawing Sheets

78
80
70
84

82
72
60
64
56
68
66
74
86
88
76
58

62
98
96
92
90
108
92

102
104
106
100
105
112
116
120
118
114
126
128
122

VIBRATORY CLEANER

FIELD OF THE INVENTION

The present invention relates to hydrocyclones in general and to hydrocyclones for cleaning paper pulp in particular.

BACKGROUND OF THE INVENTION

The quality and value of paper is directly related to the quality and uniformity of the fiber stock used to produce it. Modern sources of pulp fibers, especially fibers from recycled materials, fibers produced from tropical hardwood, and fibers produced from wood chips which have been stored in the open, are contaminated with various impurities. These impurities include lightweight particles of resin from tropical hardwood, lightweight particles of plastic and hot glue from recycled paper, broken fiber fragments from recycled paper, and heavy weight particles including sand and dirt. Hydrocyclones have found widespread use in the papermaking industry for cleaning and improving the quality of stock used for forming a paper web. Hydrocyclones employ a combination of gravity, centrifugal force, and hydrodynamic forces to separate particles and fibers of varying density and size.

Recent developments have resulted in hydrocyclones which can separate both high and low-density materials from fibers at the same time. The art related to hydrocyclones continues to develop and improve, nevertheless, it remains true that often several cleaning cycles are needed to perform an adequate separation and cleaning of a given feed of fluid containing fiber and contaminates.

Other principles for cleaning fibers are employed in other types of devices. For example, fibers are screened by forcing them to pass through screens of varying sizes. Sedimentation and flotation, including dissolved air-assisted flotation, are used in clarifying water containing fibers. Recently a new technique has utilized ultrasound to create a pressure gradient on particles which is size dependent. This techniques has been used expressly to clarify water containing pulp fibers. However these techniques have not contributed to the improvement in the design of hydrocyclones.

Additional physical forces or principles which could be employed in hydrocyclones might allow significant additional improvements in efficiency and throughput for this widely used class of devices.

SUMMARY OF THE INVENTION

The Hydrocyclone of this invention employs ultrasonic vibrations, typically between 20,000 and 100,000 Hz to improve the efficiency and throughput of hydrocyclones used in cleaning paper pulp. The action of the ultrasound is used in two ways. First it is used to create a sound/pressure gradient, sometimes referred to as a streaming effect, which causes a buoyancy effect on the relatively large fiber particles but not on the smaller particles, in particular the water molecules. This effect introduces a new force which can be added to the centrifugal force to move fibers towards the walls of a hydrocyclone. A pulp thickener based on using ultrasonic energy to separate fiber from a flow of stock is expected to substantially improved effectiveness compared to a conventional hydrocyclone thickener. The pulp thickener utilizes a hydrocyclone to form a quasi-laminar fluid flow between a top drain and a bottom drain within a substantially cylindrical chamber. An ultrasonic generator, typically a piezoelectric transmitter of ultrasonic energy, is positioned to push the fibers introduced into the hydrocyclone across stream lines defined by the quasi-laminar flow so that stream lines that exit through the top of the hydrocyclone have been substantially depleted of fibers.

The second mechanism is a technique whereby a jigging action is produced such that the heavier particles sink through lighter weight fibers to the bottom or towards the walls of the hydrocyclone. In a conventional hydrocyclone a mat of fibers can form near the walls of the cyclone chamber which can result in excessive fibers being drawn off with the heavyweight rejects. By using the jigging action, the flow of heavyweight rejects may be smaller and can contain less fibers. This improvement in separation reduces the number of hydrocyclone stages required to clean a given supply of contaminated stock.

The ultrasonic sound is produced by an ultrasonic piezoelectric oscillator or with an ultrasonic whistle or siren.

It is a feature of the present invention to provide a hydrocyclone with improved separation effectiveness.

It is a further feature of the present invention to provide a hydrocyclone with improved throughput.

It is another feature of the present invention to provide a hydrocyclone with a heavyweight reject stream containing less useful fibers.

It is a yet further feature of the present invention to provide a hydrocyclone which employs an ultrasonic whistle to improve separation efficiency.

It is yet another feature of the present invention to provide a system of hydrocyclones with fewer stages of cleaning for a given level of contamination separation.

Further objects, features and advantages of the invention will be apparent from the following detailed description when taken in conjunction with the accompanying drawings.

DESCRIPTION OF THE PREFERRED EMBODIMENTS

Figure 1:
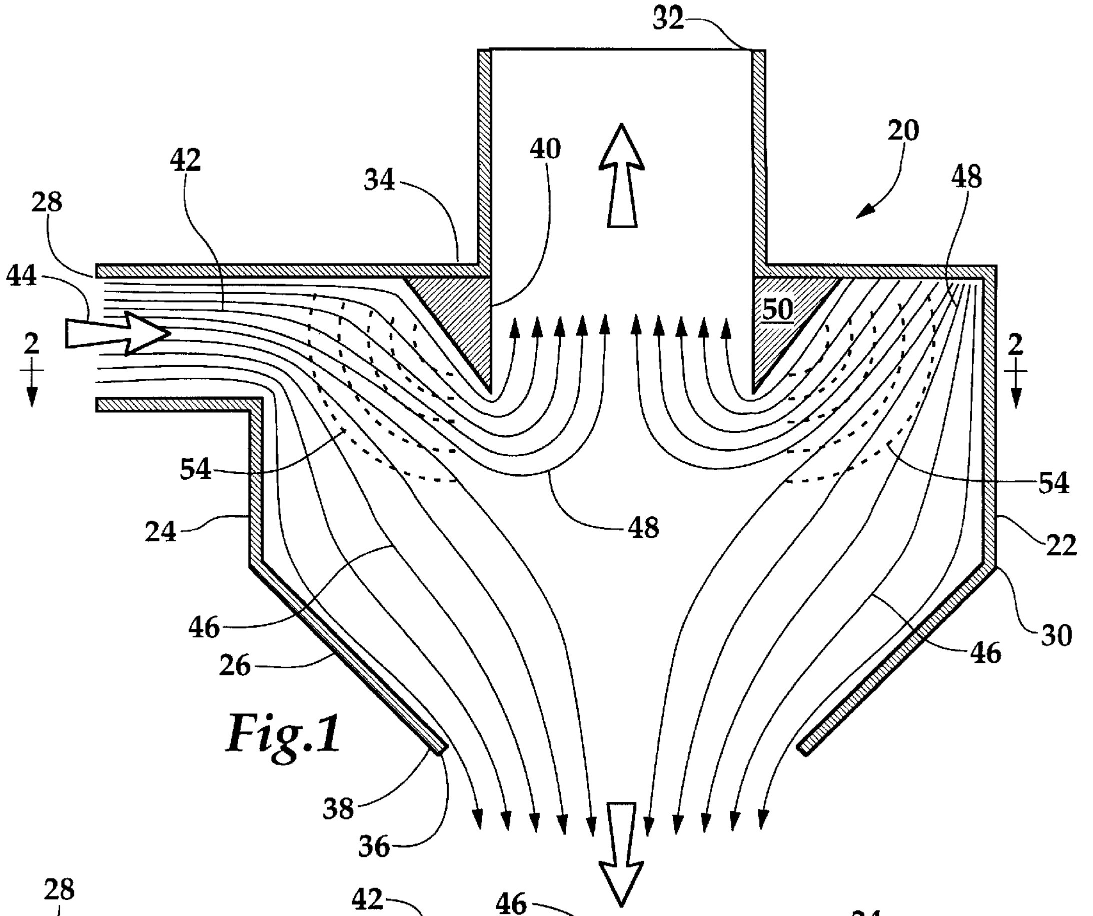
FIG. 1 is an is an illustrative, side elevational view of the hydrocyclone of this invention.

Referring more particularly to FIGS. 1–6 wherein like numbers refer to similar parts, a hydrocyclone 20 is shown in FIG. 1. The hydrocyclone 20 has a substantially cylindrical body 22 formed of a cylindrical section 24 and a conical section 26. A fluid inlet 28 injects stock containing fiber tangentially into the chamber 30 defined by the cylindrical body 22. The chamber 30 has an outlet 32 at the top 34 and an outlet 36 at the bottom 38. The outlet openings 32, 36 are aligned with an axis defined by the cylindrical body 22.

Figure 2:
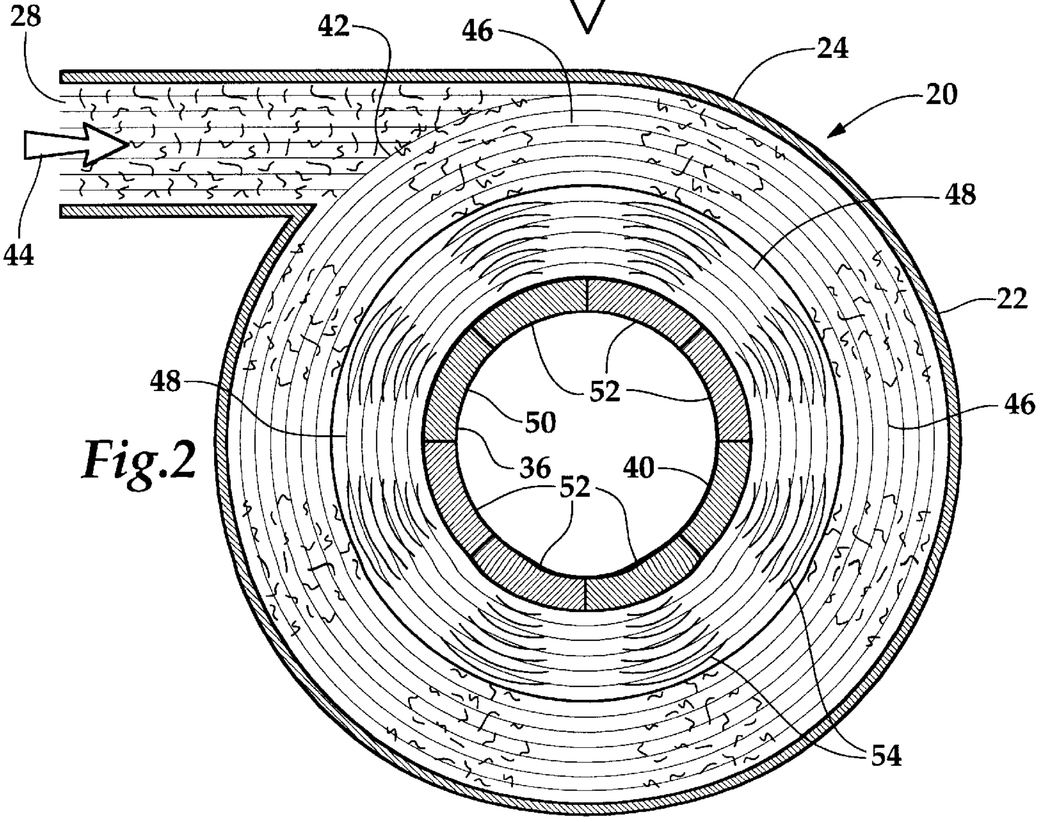
FIG. 2 is a cross-sectional plan view of the hydrocyclone of FIG. 1 taken along section line 2—2.

A pipe 40 extends from the top outlet opening 32 into the chamber 30. Streamlines 42 show how water, indicated by arrow 44, which enters the hydrocyclone 20 is split into two flows. One set of streamlines 46 flows out the bottom outlet opening 36, and one set of streamlines 48 flows to the top outlet 32. The rotation of the water injected into the hydrocyclone 20 creates a hydrodynamic flow field where the water is said to be in a quasi-laminar flow. A piezoelectric transducer 50 made up of individual crystals 52, as shown in FIG. 2, is positioned around the top outlet 32. When energized, the crystals 52 produce ultrasonic energy 54 which creates a streaming effect which pushes fibers contained in the water adjacent to the transducer 50 away from the source of ultrasonic energy. The fibers are moved across the streamlines 48 and thus out of the flow which leaves the top 34 of the hydrocyclone 20. To achieve maximum benefit from the ability of a ultrasonic energy source to move fibers within a liquid the flow of the liquid should be predictable or laminar.

Laminar flow is said to exist when the Reynolds number is within a certain range. Reynolds number is a non-dimensional number which is dependent on fluid viscosity, velocity, pipe diameter, and density. Laminar flow is characterized as a flow where turbulence is absent and wherein a theoretical particle traveling with the fluid will travel along a uniform predictable path. Laminar flow may be contrasted with turbulent flow which is covered by chaos theory, and in which a theoretical particle travels an unpredictable path. Generally laminar flow means that mixing within the fluid is not taking place. Typically, laminar flow occurs at very low flow velocities. In a hydrocyclone the centrifugal energy which the rotating flow imparts to the fluid results in a flow having many of the characteristics of laminar flow. This is a result of the conservation of angular momentum, which means that a particle in order to cross streamlines must accelerate as it moves radially inwardly and decelerate as it moves outwardly. Thus the presence of angular momentum within the fluid constrains a particle within the fluid to move along restricted streamlines producing a result similar to laminar flow.

The hydrocyclone 20 of this invention by utilizing quasi-laminar flow within the hydrocyclone 20 to achieve high volume separation with improved differentiation.

The hydrocyclone 20 has a diameter of approximately thirty-six inches with an upper outlet of about twelve inches in diameter. The ultrasonic streaming effect has a range of action which is about ten to fifty cm. This action range would be effective in a hydrocyclone with the above described dimensions to push fibers across streamlines so they will pass out the outlet 36 at the bottom of the hydrocyclone.

Ultrasonic energy may be employed in hydrocyclones designed for cleaning a flow of pulp stock by separating out heavyweight or lightweight components of the flow.

Figures 3, 4, 5, 6:
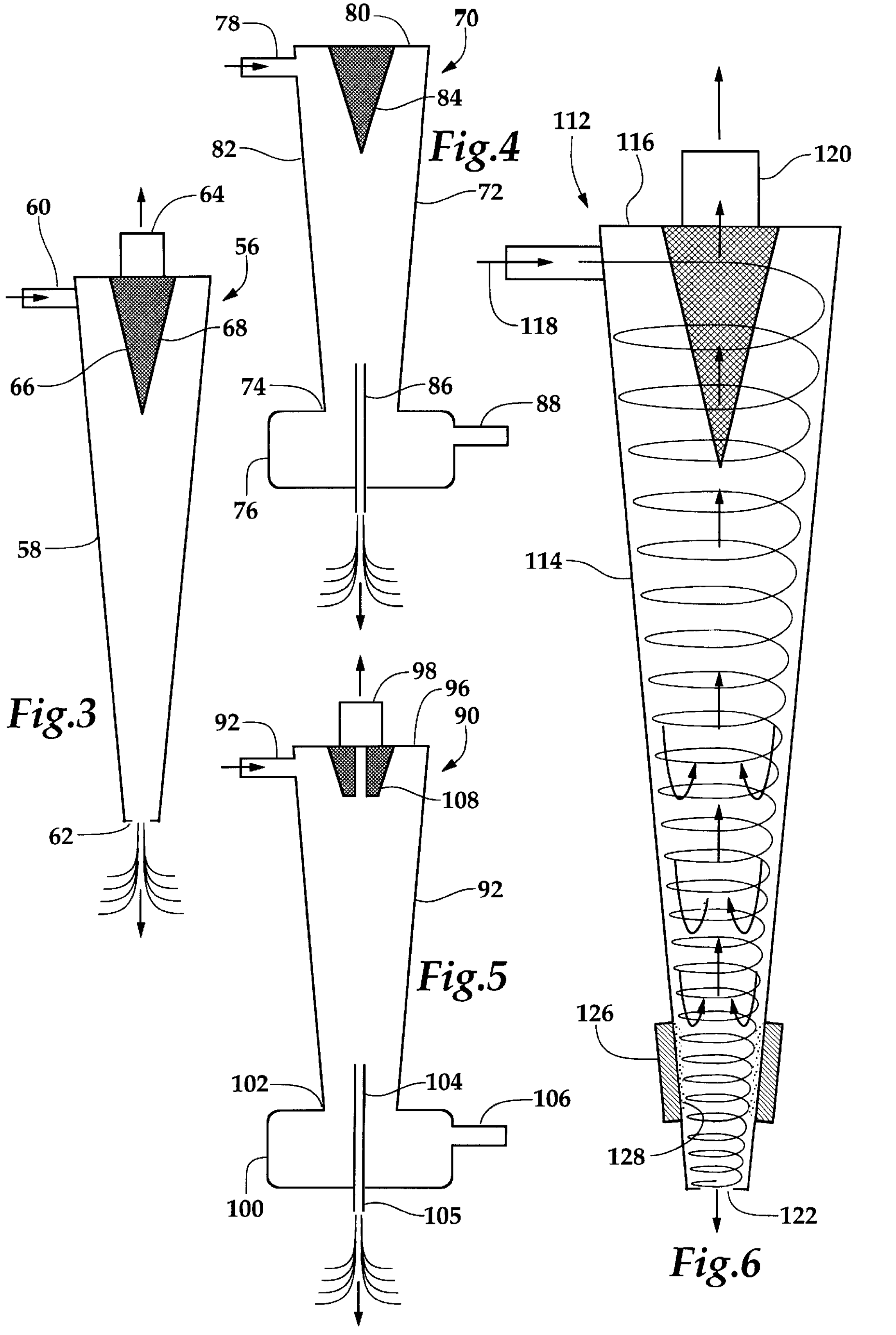
FIG. 3 is a side elevational schematic view of an alternative embodiment of the hydrocyclone of this invention.
FIG. 4 is a side elevational schematic view of a further embodiment of the hydrocyclone of this invention.
FIG. 5 is a side elevational schematic view of yet another embodiment of the hydrocyclone of this invention.
FIG. 6 is a side elevational schematic view of a further embodiment of the hydrocyclone of this invention.

An alternative embodiment hydrocyclone 56, as shown in FIG. 3, has a conical chamber 58 with a tangential inlet 60, a bottom outlet 62 for accept fibers, and an outlet 64 at the top for lightweight reject particles and fiber fragments. A conical screen 66 is placed ahead of the outlet 64 to prevent desirable fibers from leaving through the reject outlet 64. Typically the screen would be expected to rapidly become clogged with fibers. However, by vibrating the screen 66 at ultrasonic frequencies, fibers are pushed away from the screen's surface 68 to thereby prevent clogging of the screen. The screen itself may be a piezoelectric crystal which is caused to vibrate, or the screen may be connected to a source which generates ultrasonic energy. The energy could also be supplied internal to the screen 66 through the outlet 64.

A through flow cleaner 70 of this invention, as shown in FIG. 4, has an inverted conical chamber 72 in which the bottom 74 outlet opens into a second cylindrical chamber 76. An inlet 78 injects stock into the top 80 of the inverted conical chamber 72 tangentially to the cylindrical wall 82 of the inverted conical chamber 72. A centrally located vortex finder 84 acts as a source of ultrasonic energy or waves which push the fibers contain in the injected stock towards the wall 82 of the inverted conical chamber 72 and away from the vortex finder 84. This improves the separation of fibers from small lightweight contaminants. As shown in FIG. 4, a vortex finder tube 86 collects the central lightweight material and a second outlet 88 collects the heavyweight component from the second chamber 76.

Another alternative embodiment of cleaner 90 of this invention is shown in FIG. 5. The cleaner 90 has a conical chamber 92 with a tangential inlet 94 at the top 96. An upper outlet 98 draws lightweight rejects up from the center vortex. The cleaner 90 is similar to the cleaner 70 shown in FIG. 4 in having a second chamber 100 into which the conical chamber 92 empties through an outlet 102 at the bottom of the chamber 92. Again a vortex finder 104 removes, through an outlet 105, the lightweight component of the flow introduced into the cleaner 90. A heavyweight fraction is collected through a second outlet 106 from the second chamber 100. A piezoelectric ultrasonic transducer 108 is positioned at the top 110 of the of the chamber 92 surrounding the upper outlet 98. Ultrasonic energy emanating from the transducer 108 pushes fibers away from the center of the cleaner 90, increasing separation efficiency for the materials drawn from the upper outlet 98 and through the vortex finder outlet 104.

A cleaner 112 is shown in FIG. 6. This cleaner 112 again has an inverted conical chamber 114 with a tangential inlet 118 at the top 116. The conical chamber 112 has an axis defined between an upper outlet 120 and a bottom outlet 122. This type of cleaner is used to remove sand and dirt from papermaking stock. It is common for fiber to become mixed with the heavyweight contaminants near the bottom outlet 122 and result in a heavyweight reject stream that contains significant amounts of useful fiber. An acoustic field generator 124, which may be an ultrasonic piezoelectric transducer 126, is mounted near the outlet 122. The transducer 126 will separate the useful fiber from the heavyweight contaminants through a jigging action similar to the way minerals are separated based on density: the greater inertia of the heavyweight contaminants will tend to drive them through the fibers towards the wall 128 of the chamber 114. The overall result is that the heavyweight rejects contain less useful fiber, thus reducing or eliminating the need to further process the heavyweight rejects to recover useful fiber rejected with the heavyweight rejects.

It should be understood that there are many ways of generating ultrasonic energy and that the most cost effective means will generally be employed for a particular application. A crystal which responds to high frequency electromagnetic waves by vibrating at the frequency of the imposed electronic signal is referred to as a piezoelectric transducer. Other means of generating high frequency sound include ultrasonic whistles and sirens.

It should be understood that although ultrasonic energy generally refers to sound frequencies above 20,000 Hertz, in some instances sound in the audible frequency range would be effective at moving fibers and particularly for separating fibers and heavyweight contaminants as shown in FIG. 6.

It should be understood that a substantially cylindrical chamber is defined to include chambers having tapered walls forming a cone, biconic chambers, and chambers having parabolic and hyperbolic walls or wall segments.

It should be understood that the flow may be introduced through an inlet which is tangent to the wall of the chamber making up the hydrocyclone but the flow could also be introduced through an inlet where secondary structure such as a spiral or twin spiral baffle causes the water to rotate about the vertical axis of the separation chamber.

It is understood that the invention is not limited to the particular construction and arrangement of parts herein illustrated and described, but embraces such modified forms thereof as come within the scope of the following claims.

I claim:

1. A hydrocyclone for concentrating fibers in a stock comprising:

a substantially cylindrical chamber defining an interior volume and having a top and a bottom and at least one inlet adjacent the top, wherein an axis is defined between the top of the cylindrical chamber and the bottom of the cylindrical chamber, the inlet positioned to inject stock tangent to the cylindrical chamber so as to cause the stock to rotate within the chamber and a portion of the cylindrical chamber forming a conical section co-joined and extending downwardly from the cylindrical chamber, the conical section tapering inwardly to at least one outlet adjacent the bottom;

an upper outlet centered about the chamber axis at the top of the cylindrical chamber, the inlet causing the fluid to rotate about said chamber axis; and a means for generating ultrasonic energy and introducing ultrasonic energy into the interior volume of the substantially cylindrical chamber, the means for generating ultrasonic energy being positioned about the upper outlet to project ultrasonic energy radially outward of the axis, the means for generating and introducing being adapted to influence the movement of fibers entrained in the fluid.

2. The hydrocyclone of claim 1 wherein the means for generating ultrasonic energy is a piezoelectric transducer.

3. The hydrocyclone of claim 2 wherein the piezoelectric transducer is constructed of several individual piezoelectric transducers in an array.

4. The hydrocyclone of claim 1 wherein the chamber has a diameter on the order of thirty-six inches and wherein an outlet is centered about the axis of the chamber and has a diameter of approximately twelve inches, the ultrasonic means being an array of ultrasonic transducers positioned about the inlet and directed away from the axis, and the chamber has a second outlet at the bottom of the chamber opposite the top outlet.

5. A hydrocyclone comprising:

a substantially cylindrical chamber having an inner surface, a top, a bottom, and an axis defined by the substantially cylindrical chamber, the axis extending from the top to the bottom;

an inlet positioned adjacent to the top and directed tangent to the inner surface;

a first outlet at the bottom of the chamber and coaxial with the axis;

a second outlet at the top of the chamber and coaxial with the axis;

a screen surrounding the second outlet; and an ultrasonic source causing the screen to emit ultrasonic energy so the screen does not become clogged with fibers.

6. The hydrocyclone of claim 5 wherein the screen is constructed of a piezoelectric ultrasonic transducer.

7. A hydrocyclone comprising:

a substantially cylindrical chamber having an inner surface, a top, a bottom and an axis defined by the substantially cylindrical chamber, the axis extending from the top to the bottom;

an inlet positioned adjacent to the top and directed tangent to the inner surface;

a first outlet at the bottom of the chamber and coaxial with the axis;

a second outlet at the top of the chamber and coaxial with the axis;

an acoustic field generator adjacent to the bottom of the chamber and directed towards the axis, to increase separation of heavy weight contaminants from useful fibers near the inner surface of the substantially cylindrical chamber.

8. The hydrocyclone of claim 7 wherein the acoustic field generator is a piezoelectric transducer.

9. The hydrocyclone of claim 8 wherein the piezoelectric transducer has a characteristic frequency of about 20,000 Hz.

10. A hydrocyclone for processing papermaking pulp comprising:

a conical chamber having an inner surface, a top, a bottom and an axis defined by the conical chamber, the axis extending from the top to the bottom;

an inlet position adjacent to the top and directed tangent to the inner surface for injecting stock containing fibers into the conical chamber so as to rotate within the conical chamber;

a first outlet at the bottom of the chamber and coaxial with the axis;

a second chamber positioned beneath the conical chamber, wherein the first outlet opens into the second chamber;

a vortex finder extending along the axis of the conical chamber and into the first chamber, the vortex finder including a passageway for fluid which exits from the second chamber;

an outlet from the second chamber; and a centrally located second vortex finder positioned at the top of the conical chamber and coaxial with the axis of the chamber incorporating a source of ultrasonic energy which pushes fibers contained in the injected stock towards the inner surface of the conical chamber away from the vortex finder.

11. The hydrocyclone of claim 10 further comprising an outlet at the top of the chamber, the outlet extending along the axis of the chamber.

12. The hydrocyclone of claim 10 wherein the ultrasonic source is a piezoelectric transducer.

13. A method of separating and concentrating fibers for use in papermaking comprising the steps of:

introducing a stream of water containing fibers into and at a top of a substantially cylindrical chamber; so as to cause the water in the chamber to rotate within the cylindrical chamber and about an axis defined between a chamber top and a chamber bottom;

introducing ultrasonic energy at the top of the chamber into the cylindrical chamber so that the ultrasonic energy is directed substantially radially outwardly with respect to the axis;

moving at least some fibers introduced into the substantially cylindrical chamber in a radial direction by the action of the ultrasonic energy introduced into the substantially cylindrical chamber;

removing a fraction of the water from a drain connected to the bottom of the substantially cylindrical chamber; and removing a second fraction of the water from a second drain connected at the top of the chamber.

14. A method of improving the operation of a hydrocyclone, used for separating particles of varying size, weight and density suspended in a liquid, the method comprising:

directing liquid containing particles to be separated into a hydrocyclone having a substantially cylindrical body and directing the liquid, so as to causing a rotating column of liquid to exist within the hydrocyclone substantially cylindrical body, thus creating quasi-laminar flow within the substantially cylindrical body, the substantially cylindrical body defining an axis;

causing a piezoelectric ultrasonic energy source to direct ultrasonic energy radially outwardly and using that energy to move particles in a radially outward direction relative to an axis defined by the rotating column of liquid.

* * * * *